(12) United States Patent
Shiino et al.

(10) Patent No.: US 6,267,442 B1
(45) Date of Patent: Jul. 31, 2001

(54) SEAT FOR VEHICLES

(75) Inventors: Joutaro Shiino; Toshihiko Yamanaka; Masahiro Munakata, all of Hino (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 09/515,395

(22) Filed: Feb. 29, 2000

(30) Foreign Application Priority Data

Aug. 19, 1999 (JP) .................................................. 11-233089
Dec. 8, 1999 (JP) .................................................. 11-348797

(51) Int. Cl.[7] .................................................. A47C 1/08
(52) U.S. Cl. ........................................ 297/254; 297/250.1
(58) Field of Search .................................. 297/250.1, 254

(56) References Cited

U.S. PATENT DOCUMENTS 5,941,601 * 8/1999 Scott et al. ........................ 297/250.1
6,095,604 * 8/2000 Stack et al. ........................... 297/254

FOREIGN PATENT DOCUMENTS 7-61268   3/1995  (JP) .
9-11847   1/1997  (JP) .

* cited by examiner

Primary Examiner—Anthony D. Barfield
(74) Attorney, Agent, or Firm—Oblon, Spivak, McClelland, Maier & Neustadt, P.C.

(57) ABSTRACT

A vehicle seat has a tether anchor disposed on a rear surface of a seatback to which a hook on an upper end of a child's seat is engaged for fixing of an upper portion of the child's seat. The vehicle seat has a seatback frame to which the tether anchor is fixed. The tether anchor is covered with a cover formed with a notch along a track of the hook in a locking operation so that a substantial part of the tether anchor is covered with the cover except a portion of the tether anchor on which the hook is locked. This will improve external appearance of the vehicle seat and avoid deterioration of loading ability of the vehicle seat and comfortability of an occupant in the vehicle.

6 Claims, 15 Drawing Sheets

SEAT FOR VEHICLES

CROSS-REFERENCE TO RELATED APPLICATIONS

This application is related to and claims priority, under 35 U.S.C. § 119, to Japanese Parent Application No. 11-233089 filed on Aug. 19, 1999 and Japanese Patent Application No 11-348797 filed on Dec. 8, 1999, the entire contents of which are incorporated by reference herein.

BACKGROUND OF THE INVENTION

1. Field of the Invention

The present invention relates to a seat for vehicles with a child's seat fixed to it. For clarification, hereinafter, the former and the latter are referred to as "vehicle seat" and "child's seat", respectively.

2. Discussion of Background

Conventionally, a child's seat is generally fixed to a vehicle seat such that its lower portion of fastened on the vehicle seat by for example a seat belt. It has been proposed that an upper portion of the child's seat is also fastened such that a hook on an upper end of the child's seat is engaged with a tether anchor on a rear surface of a seatback of the vehicle seat or at an other position inside the vehicle.

FIG. 1 is a perspective view of a vehicle seat 1 of the type as described above in which reference numeral 2 represents a seat portion; 3, a seatback foldable with respect to the seat portion 2; and 4, a child's seat fixed to the vehicle seat 1. In use of the child's seat 4, a seat belt 6 is passed through a through hole 5 on a lower portion of the child's seat 4 and is fixed to the vehicle body. Then, a hook 8 attached via a belt 7 to an upper end of the child's seat 4 is locked on a tether anchor 9 at a rear surface of the seatback 3. Thus, the upper portion of the child's seat 4 s fixed to an upper portion 10 of the seatback 3.

FIGS. 2 and 3 represent a further example of a tether anchor arrangement in which the tether anchor 14 to be described below in detail is disposed on a mount 12 in the form of a parcel board 11 behind a back seat of a vehicle and is covered with a cover 13.

More specifically, as best shown in FIG. 3, the cover 13 is mounted on the parcel board 11 together with the tether anchor 14, using a bolt 16 which passes through the board 11 and an partition panel 15 below the board 11 and over which a nut 17 is screwed. The cover 13 is pivotable upward about a thinned portion 18 to uncover the tether anchor 14 which is formed with a lock hole 19.

When the child's seat is not used, the tether anchor 14 is covered with the cover 13 so as not to be seen from outside. When the child's seat is to be used, the cover 13 is swung upward to uncover the tether anchor 14; and the hook 8 attached via the belt 7 to the upper end of the child's seat 4 in a manner like to the example shown in FIG. 1 is engaged with the lock hole 19 so that the child's seat is fixed.

However, in the conventional structure shown in FIG. 1, the tether anchor 9 is protruded from the rear surface of the seatback 3, which gives poor external appearance and deteriorates loading ability of the vehicle seat when the seatback 3 is folded. Such projection also limits movement of an occupant in the vehicle to impair comfortability in the vehicle. Even in the conventional structure shown in FIG. 2 which has the cover 13 to conceal the tether anchor 14 which the child's seat is not used, the cover 13 itself is protruded extensively from the parcel board 11 so that external appearance is not improved so much. Moreover, when the child's seat is to be used, the tether anchor 14 is uncovered for engagement of the hook 8 with the lock hole 19 so that the inside of the cover 13 and the tether anchor 14 are exposed. Thus, the problem of poor external appearance still remains as in the case of the structure shown in FIG. 1.

The present invention was made in view of the above and has its object to improve external appearance of a seat for vehicles with a tether anchor which serves for fixing of an upper portion of a child's seat and to avoid deterioration of loading ability of the vehicle seat and comfortability of an occupant in the vehicle.

SUMMARY OF THE INVENTION

The present invention provides a seat for vehicles with a tether anchor on a rear surface of a seatback to which a hook on an upper end of a child's seat is engaged for fixing of an upper portion of the child's seat, including a seatback frame to which the tether anchor is fixed and a cover formed with a notch along a track of the hook in a locking operation such that a substantial part of the tether anchor is covered with the cover except a portion of the tether anchor on which the hook is locked.

With the arrangement as described above, the substantial part of the tether anchor except the portion thereof on which the hook is locked is covered with the cover; the hook is passed through the notch on the cover and locked on the tether anchor which is covered with the cover. As result, exposure or protruding of the tether anchor is minimized.

According to the present invention, preferably a shoulder substantially of a size adapted to a thickness of a seatback board is formed on an outer periphery of the cover except a top end thereof to provide a space for accommodating, with no interference, the hook in a locking relationship with the tether anchor which extends downwardly from top end of the cover. This will prevent the cover from being protruded beyond the seatback board and prevent the hook from being protruded after it is locked on the tether anchor.

According to the present invention, preferably a lid is provided to block the notch on the cover such that inside of the notch cannot be seen from outside at all, which will further improve the external appearance.

The lid is preferably formed integral with the cover, which will prevent the lid from being lost in use of the tether anchor and will reduce the number of the components used, leading to reduction in number of stages in the assembling procedure.

Preferred embodiments of the present invention will be described in conjunction with the attached drawings.

DETAILED DESCRIPTION OF THE PREFERRED EMBODIMENTS

Figure 4:
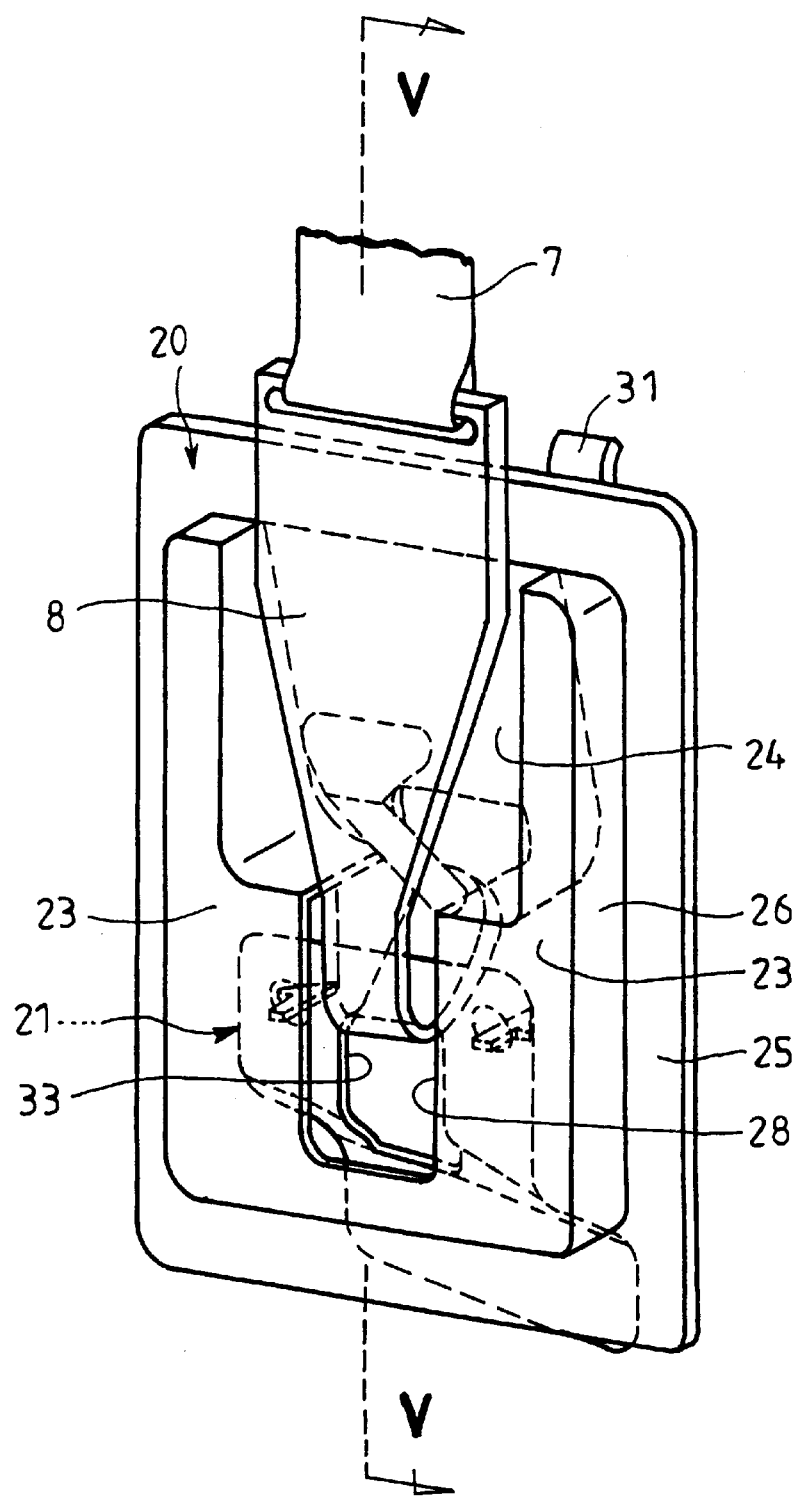
FIG. 4 is a perspective view of a first embodiment of the present invention.
Figure 5:
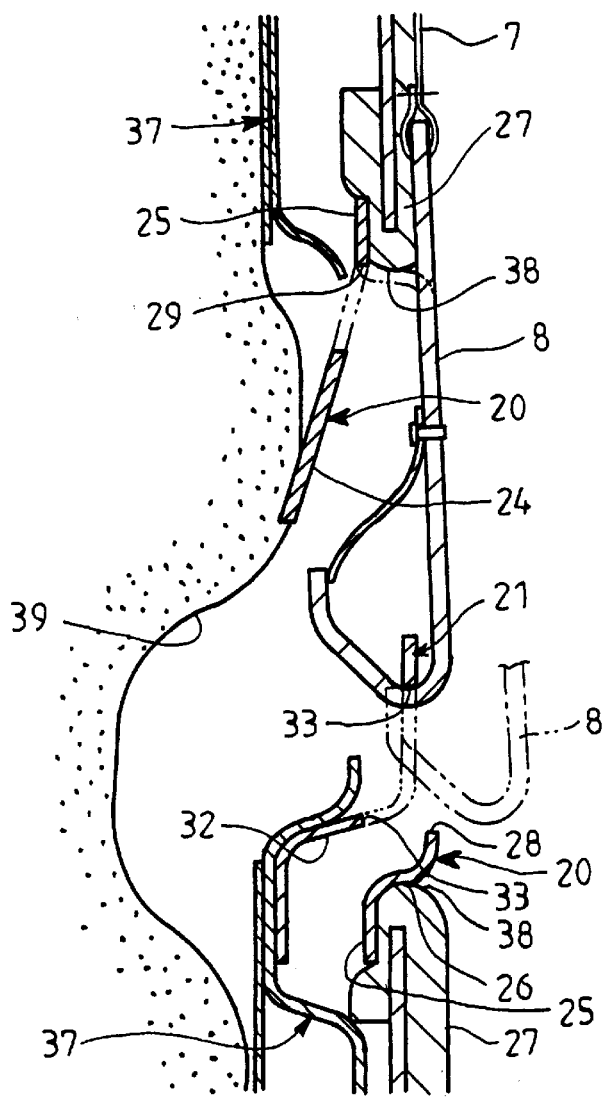
FIG. 5 is a cross-sectional view taken along the line V—V in FIG. 4.
Figure 6:
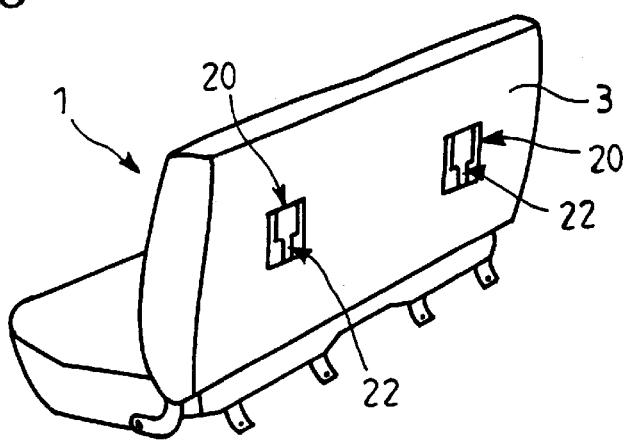
FIG. 6 is a perspective view of a vehicle seat showing the application of the structure of FIG. 4.

FIGS. 4–15 represent a first embodiment of the present invention. In this embodiment, a tether anchor 21 as shown in FIGS. 4 and 5 is disposed on a rear surface of a seatback 3 of, for example, a seat 1 for vehicles as shown in FIG. 6 and is covered with a cover 20. The cover 20 is formed with a notch 28 through which a hook 8 is passed for fixing of the upper portion of a child's seat 4 (See FIG. 1).

The tether anchor 21 has a crank-shaped or loose N-shaped section as shown in FIG. 5. This is, the tether anchor 21 includes upper and lower portions extending vertically in a mutually deviant relationship and an intermediate curved portion 32. The lower portion of the tether anchor 21 is fixed to a seatback frame 37 in the seatback 3 by for example welding. The upper portion of the anchor 21 is formed with an opening 33 for engagement with the hook 8 and holes 34 which are above the hole 33 and at opposite sides with respect to the hole 33, the holes 34 being provided for engagement with a pair of pawls 30 horizontally protruded on a rear surface of the cover 20.

Figure 7:
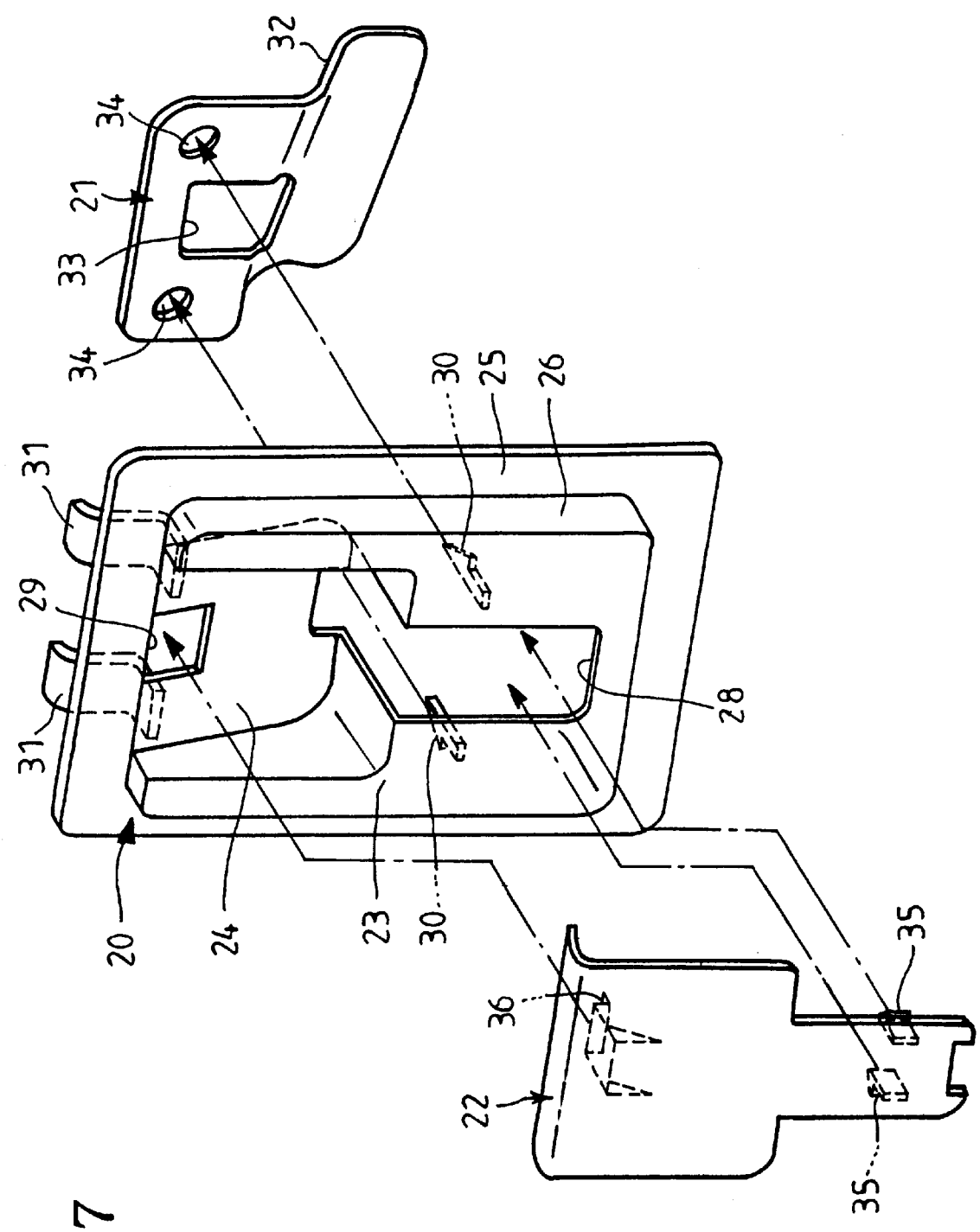
FIG. 7 is an exploded perspective view showing the mounting of the tether anchor and a lid to the cover shown in FIG. 4.

Clearly as shown in FIG. 7 (in exploded view) the cover 20 has a convex portion 23 extending over an entire lower half of the cover 20 and opposite sides of an upper half of the cover 20 to leave a flange 25 on an outer periphery of the cover 20. The upper half of the cover 20 is further formed between the convex sides with a recessed portion 24 which retreats downwardly. Between the flange 25 and the convex portion 23 on the cover 20 is a shoulder 26 which is of a size substantially adapted to thickness of a seatback board 27 to be described hereinafter in connection with FIGS. 5, 9 and 12.

The convex portion 23 is formed with a notch 28 which extends along a track of the hook 8 in a locking operation and opens into the recessed portion 24. A small opening 29 is formed on an upper end of the recessed portion 24.

An upper end of the flange 25 is provided at its rear surface with a pair of lock pieces 31 directed upwardly.

A lid 22 shown in FIGS. 6, 7, 11 and 12 is a member to block the notch 28 when the hook 8 is not locked on the tether anchor 21, i.e. when the hook 8 is not in use. A lower half of the lid 22 is of a size slightly smaller than the notch 28 and has at opposite sides of its rear surface a pair of pieces 35 which are protruded for engagement with the opening 33 of the tether anchor 21. An upper half of the lid 22 is of a size slightly smaller than the recessed portion 24 and is bent at its upper edge with a dimension slightly smaller than the thickness of the shoulder 26. The upper half of the lid 22 has at its rear surface a piece 36 which is protruded for engagement with the opening 29 of the recessed portion 24.

Figure 8:
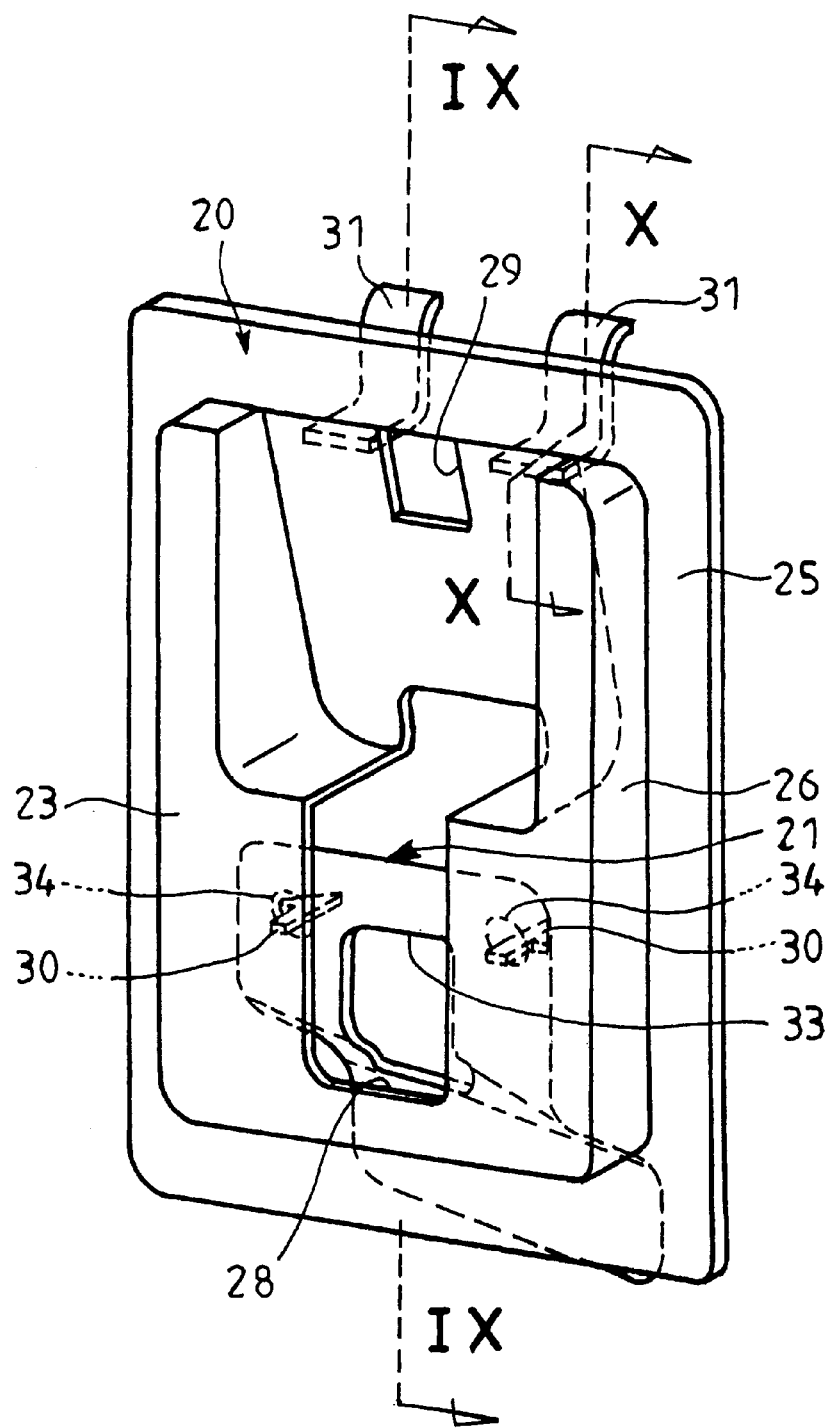
FIG. 8 is a perspective view showing the cover of FIG. 4 before the hook is mounted thereto.

The tether anchor 21 is fixed to the seatback frame 37 which has not yet the seatback board 27 (see FIGS. 5, 9 and 12) mounted thereto. Next, as shown in FIG. 10, the pieces 31 on the rear upper surface of the flange 25 of the cover 20 are engaged with the seatback frame 37 while, as shown in FIGS. 8 and 13, the lower portion of the cover 20 is placed on the tether anchor 21 to engage the pawls 30 of the cover 20 with the holes 34 of the anchor 21. Thus, fitting of the cover 20 is completed.

Figure 9:
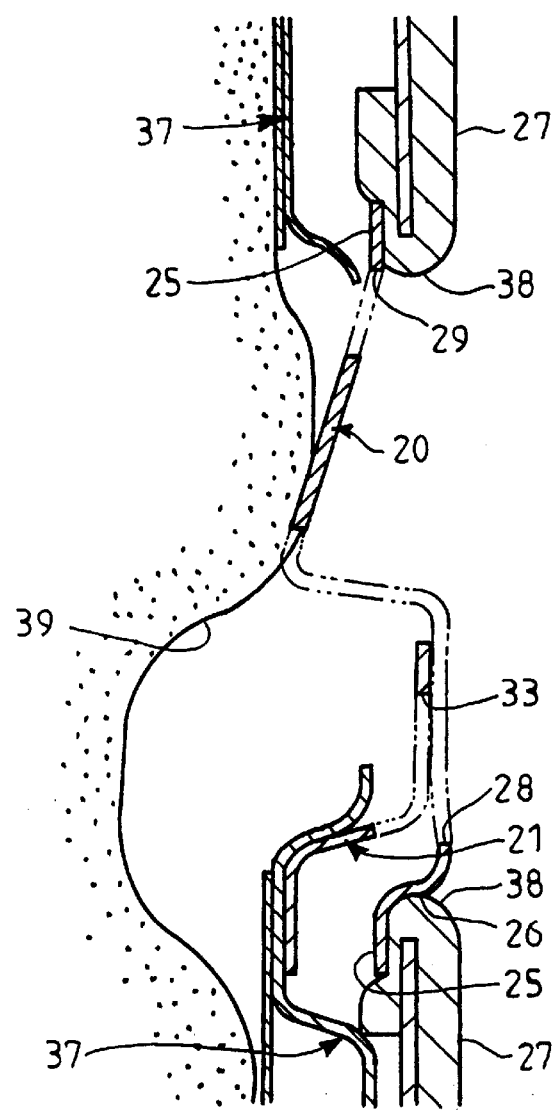
FIG. 9 is a cross-sectional view taken along the line IX—IX in FIG. 8.
Figure 10:
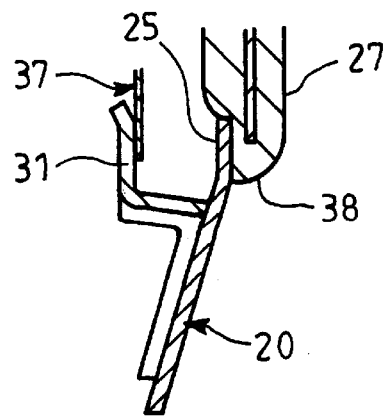
FIG. 10 is a cross-sectional view taken along the line X—X in FIG. 8.

After the cover 20 is fitted to the tether anchor 21, the seatback board 27 is mounted on the seatback frame 37 such that the board 27 is urged at its opening 38 onto the flange 25 of the cover 20 as shown in FIG. 9. Thus, with the convex portion 23 of the cover 20 (FIG. 8) being fitted in the opening 38 of the seatback board 27, the flange 25 of the cover 20 is pressed down by the seatback board 27 and is fixed.

Positioning of the seatback board 27 is much facilitated since, as described above, the seatback board 27 is mounted on the seatback frame 37 after the cover 20 is placed on the tether anchor 21. The flange 25 of the cover 20 is hidden behind the seatback board 27 and is not exposed to outside, which will improve the external appearance and can minimize scratching or hooking of the cover 20.

As shown in FIG. 8, the opening 33 of the tether anchor 21 is exposed at the notch 28 of the cover 20 and a substantial part of the tether anchor 21 except the opening 33 is covered by the cover 20 and is not seen from outside.

Figure 11:
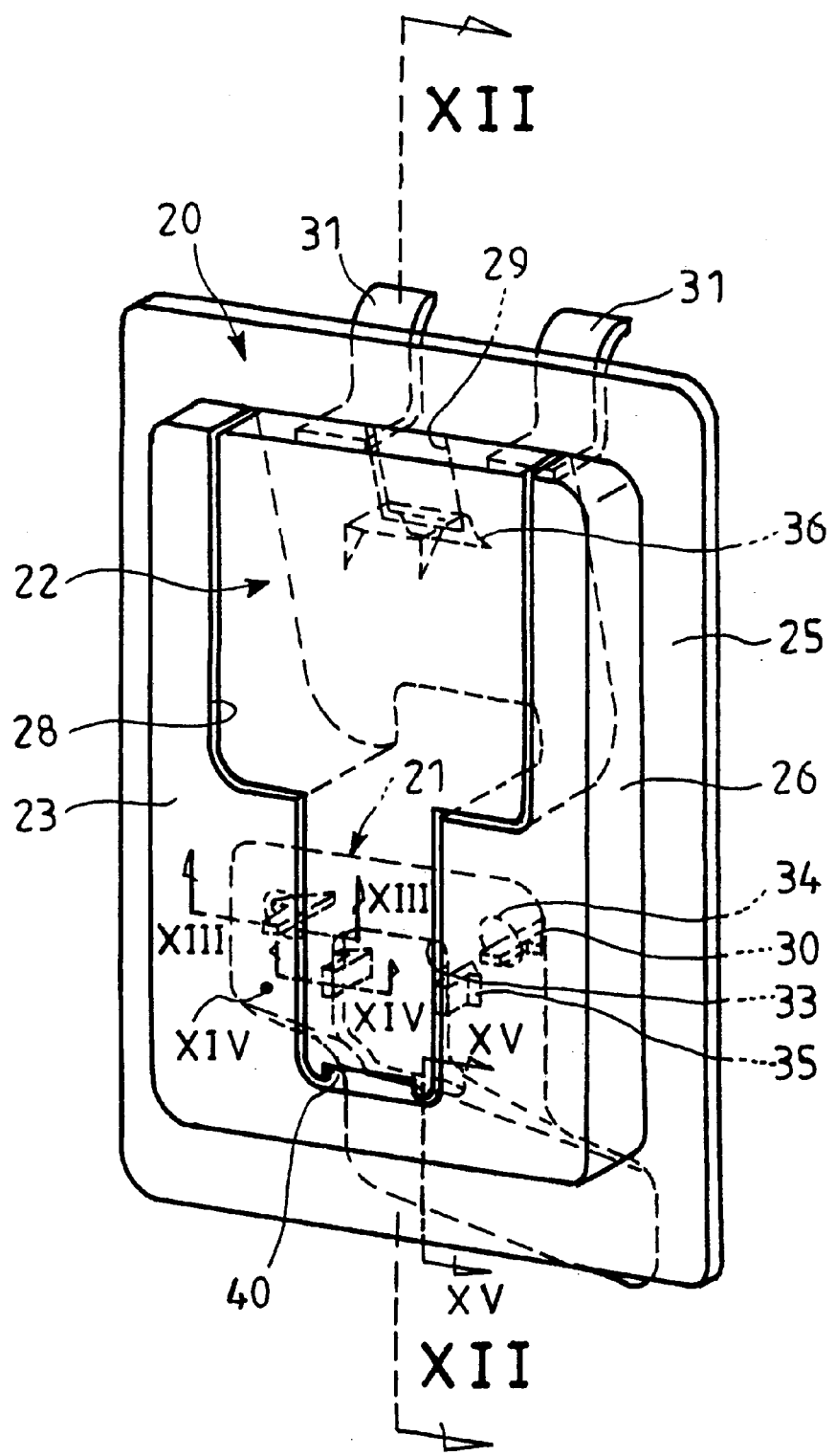
FIG. 11 is a perspective view showing the cover of FIG. 8 on which the lid is mounted.
Figure 12:
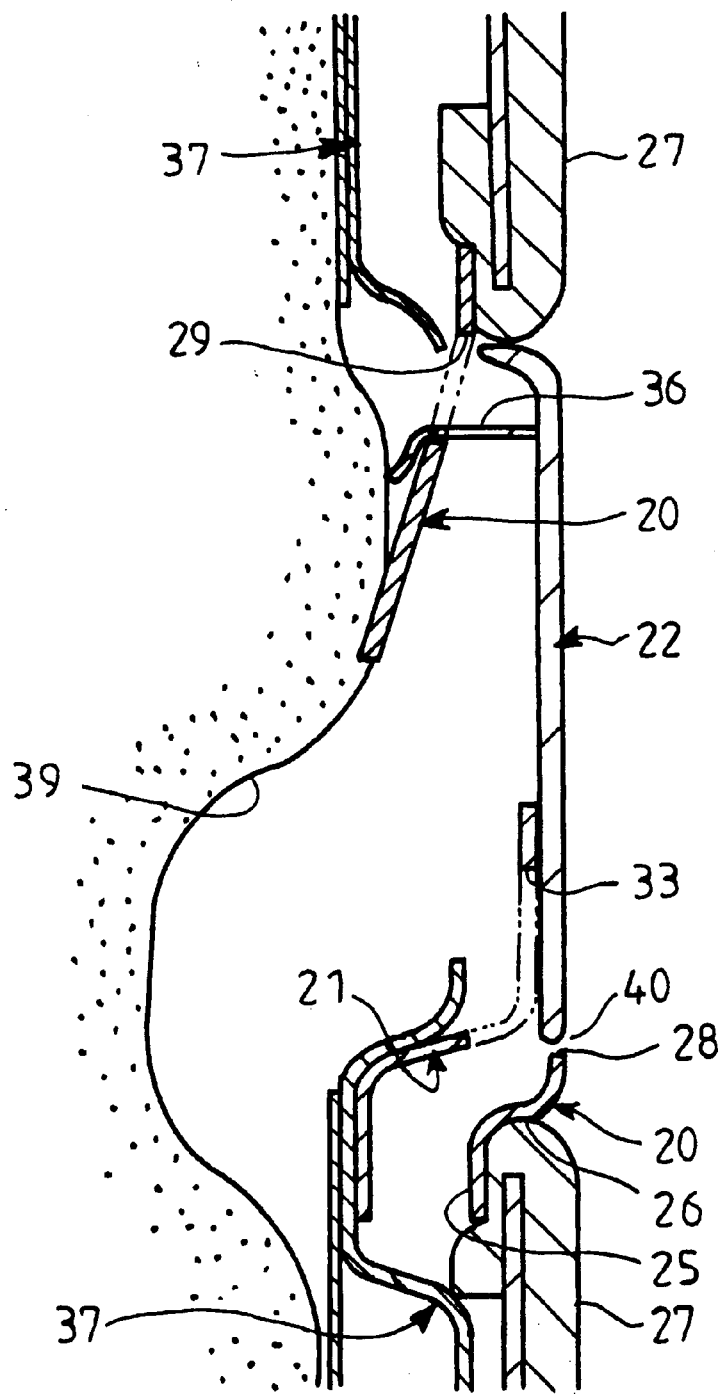
FIG. 12 is a cross-sectional view taken along the line XII—XII in FIG. 11.
Figure 13:
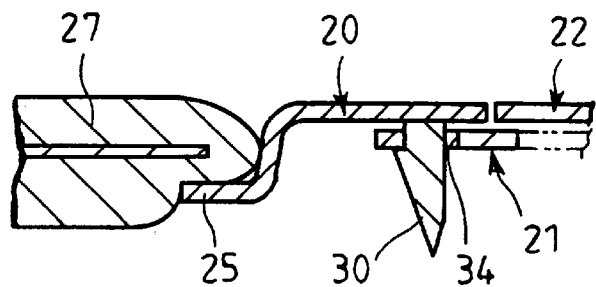
FIG. 13 is a cross-sectional view taken along the line XIII—XIII of FIG. 11.
Figure 14:
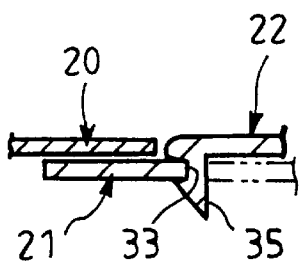
FIG. 14 is a cross-sectional view taken along the line XIV—XIV of FIG. 11.

With the cover 20 being fixed in such condition that it covers the substantial part of the tether anchor 21 except the opening 30, the lid 22 is fitted into the notch 28 and the cover 20 such that the piece 36 on the rear surface of the lid 22 is snugly engaged with the opening 29 of the recessed portion 24 of the cover 20 as shown in FIG. 12. As a result, the lid 22 is retained in the condition that the pieces 35 on the rear surface of the lid 22 are snugly engaged with the opening 33 of the tether anchor 21 as shown in FIGS. 11 and 14 and that the lid 22 blocks the notch 28 of the cover 20.

Figure 15:
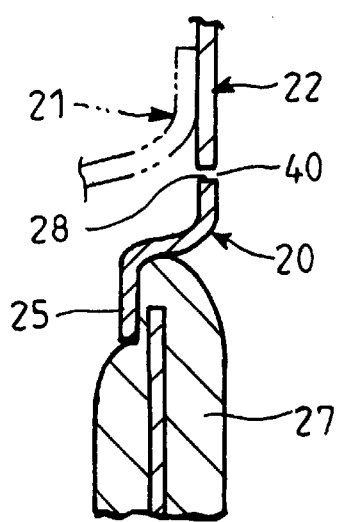
FIG. 15 is a cross-sectional view taken along the line XV—XV of FIG. 11.

In this case, preferably the lower half of the lid 22 is slightly shorter in length than the notch 28 so as to leave a gap 40 between the lid 22 and a lower edge of the notch 28 as shown in FIGS. 11, 12 and 15. The gap 40 will make it possible to readily remove the lid 22 by inserting for example a coin into the gap 40.

In FIGS. 5, 9 and 12, reference numeral 39 represents a back pad inside the seatback 3.

When the child's seat 4 (FIG. 1) is not in use, the lid 22 is engaged into and blocks the notch 28 of the cover 20 as shown in FIGS. 11 and 12 so that the inside of the notch 28 of the over 20 cannot be seen from outside and good external appearance is maintained. As shown in FIG. 12, both the cover 20 and the lid 22 are not protruded from the seatback board 27 so that loading ability of the vehicle seat and comfortability of the occupant in the vehicle are not adversely affected when the seatback 3 is folded back.

When the child's seat 4 is to be used, for example a coin is inserted into the gap 40 between the lid 22 and the lower edge of the notch 28 as shown in FIGS. 11, 12 and 15 to open and remove the lid 22 from the notch 28 of the cover 20 into the condition as shown in FIGS. 8 and 9.

In this case, though the lid 22 is removed from the notch 28 of the cover 20, the substantial part of the tether anchor 21 except the opening 33 for the locking of the hood 8 (the portion on which the hook is locked) is covered by the cover 20, which will minimize exposure or protrusion of the tether anchor 21. The seatback from 37 and the back pad 39 inside the seatback 3 are concealed by the cover 20, which will contributes to improvement of external appearance.

Figure 1:
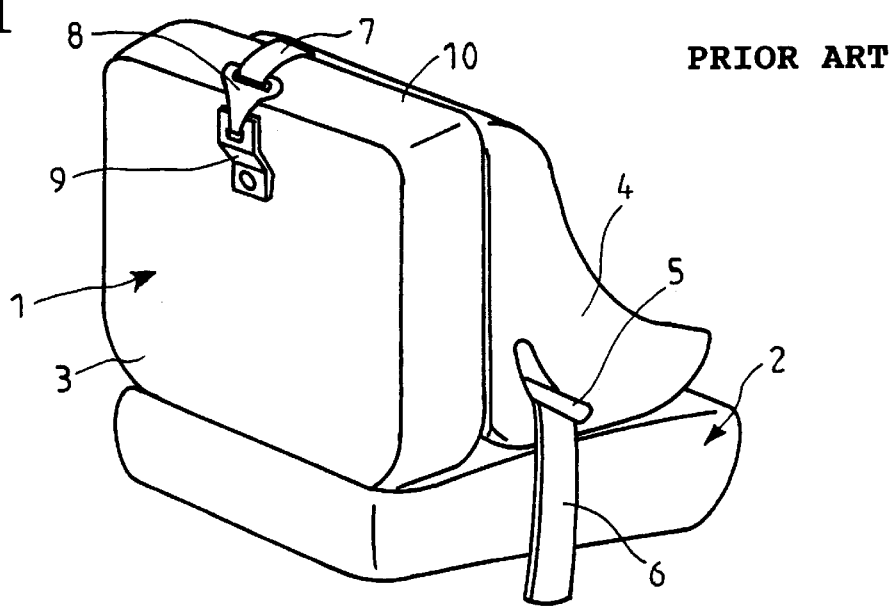
FIG. 1 is a perspective view of a conventional vehicle seat with a tether anchor.
Figure 2:
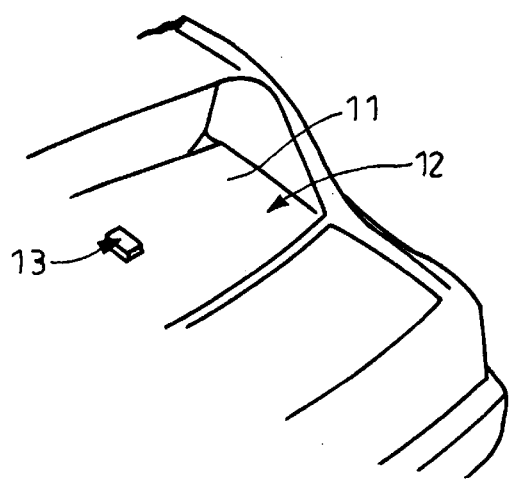
FIG. 2 is a perspective view showing a further example of a tether anchor arrangement, which is covered with a cover.
Figure 3:
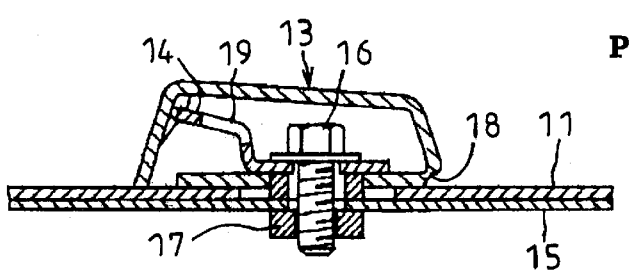
FIG. 3 is a cross-sectional view of the cover shown in FIG. 2.

Then, the child's seat 4 is placed on the vehicle seat 1 as is the case of FIG. 1 and the hook 8 attached via the belt 7 to the upper end of the child's seat 4 is passed along the notch 28 as shown in FIGS. 4 and 5 and is inserted at its tip into the opening 33 of the tether anchor 21 as shown by two-dot chain line in FIG. 5 The belt 7 is pulled to lock the hook 8 on the opening 33 of the tether anchor 21 as shown by solid line in FIGS. 4 and 5. Thus, the child's seat 4 is fixed to the vehicle seat 1 via the belt 7.

Under the condition shown in FIGS. 4 and 5 where the hook 8 is locked on the opening 33 of the tether anchor 21, the recessed portion 24 of the cover 20 provides a space for accommodating the hook 8. As a result, the hook 8 locked on the tether anchor 21 is satisfactorily accommodated in the recessed portion 24 and is not protruded beyond the cover 20, which will contribute to improvement of external appearance.

In the above embodiment, the substantial part of the tether anchor 21 except the opening 33 for locking of the hook 8 (the portion on which the hook is locked) can be covered by the cover 20. The hook 8 can be locked on the tether anchor 21 in the cover 20 through the notch 28 while the tether anchor 21 is covered with the cover 20. This will minimize exposure and protrusion of the tether anchor 21 and makes it possible to extensively improve external appearance of the vehicle seat 1 with the tether anchor in comparison with the conventional vehicle seats. Moreover, deterioration of loading ability of the vehicle seat and comfortability of an occupant in the vehicle can be avoided.

In the above-mentioned embodiment, the shoulder 26 of a size substantially adapted to the thickness of the seatback board 27 is formed on the outer periphery of the cover 20 except the upper end thereof and the recessed portion 24 is formed to provide a space for accommodating the hook 8 locked on the tether anchor 21 which extends downward from the upper end of the cover 20. As a result, the cover 20 is prevented from being protruded beyond the seatback board 27; the hook 8 is prevented from being protruded even after it is locked on the tether anchor 21. Thus, it is possible to improve external appearance of the vehicle seat 1 with the tether anchor 21 and to avoid deterioration of loading ability of the vehicle seat and comfortability of an occupant in the vehicle.

Provision of the lid 22 for blocking the notch 28 of the cover 20 as described in the above embodiment will further improve external appearance when the hook 8 is not locked on the tether anchor 21, i.e. when the child's seat is not used.

FIGS. 16–20 represent a second embodiment of the present invention in which the lid 22 for blocking the notch 28 of the cover 20 when the child's seat is not used is formed integral with the cover 20. More specifically, the lid 22 substantially rectangular in shape and having such size as to cover the notch 28 and recessed portion 24 is formed integral with and is continuous to the lower end of the cover 20.

In this case, an integral hinge 41 is formed between the lid 22 and the cover 20 and provides a thinned portion (See FIG. 16) about which the lid 22 is pivotable to selectively open and close the notch 28 of the cover 20. A free end of the lid 22 away from the hinge 41 provides a curved portion 42 with a cutout through which a user may manipulate to open the lid 22 closed.

Figure 16:
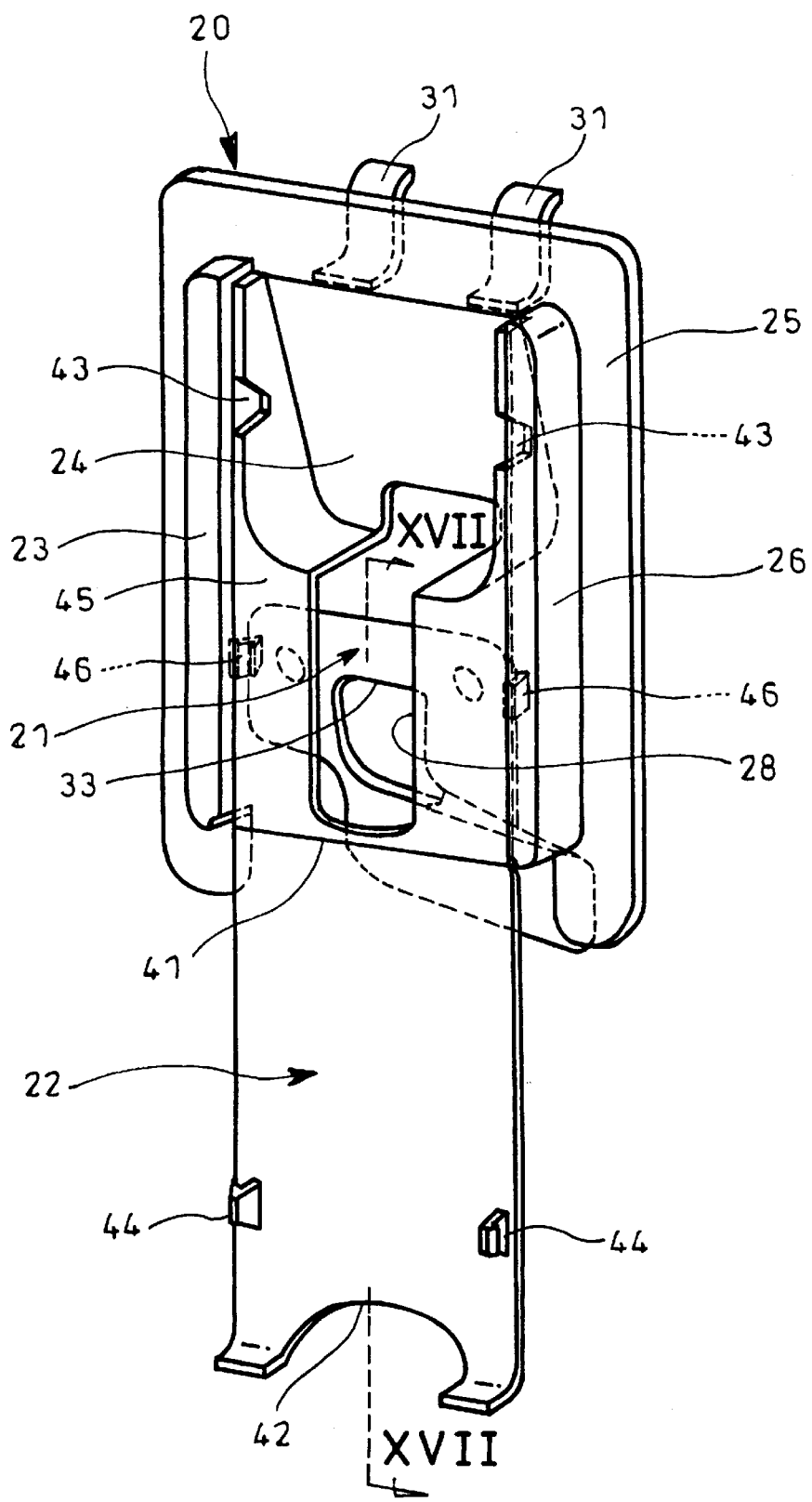
FIG. 16 is a perspective view of a second embodiment of the invention.
Figure 17:
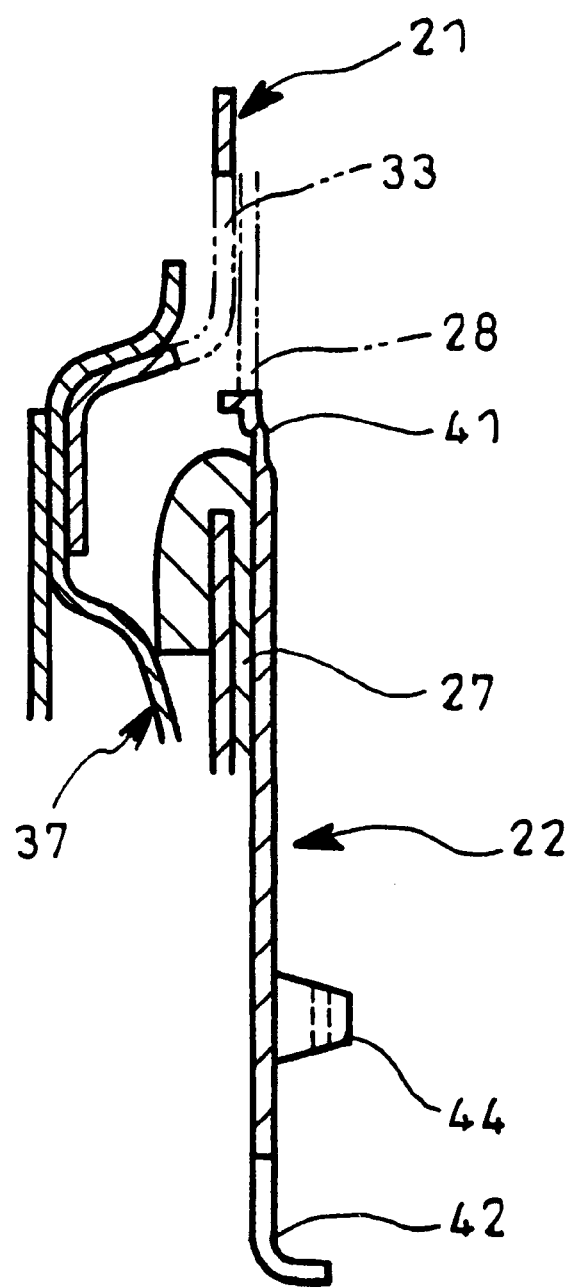
FIG. 17 is a cross-sectional view taken along the line XII—XII in FIG. 16.
Figure 18:
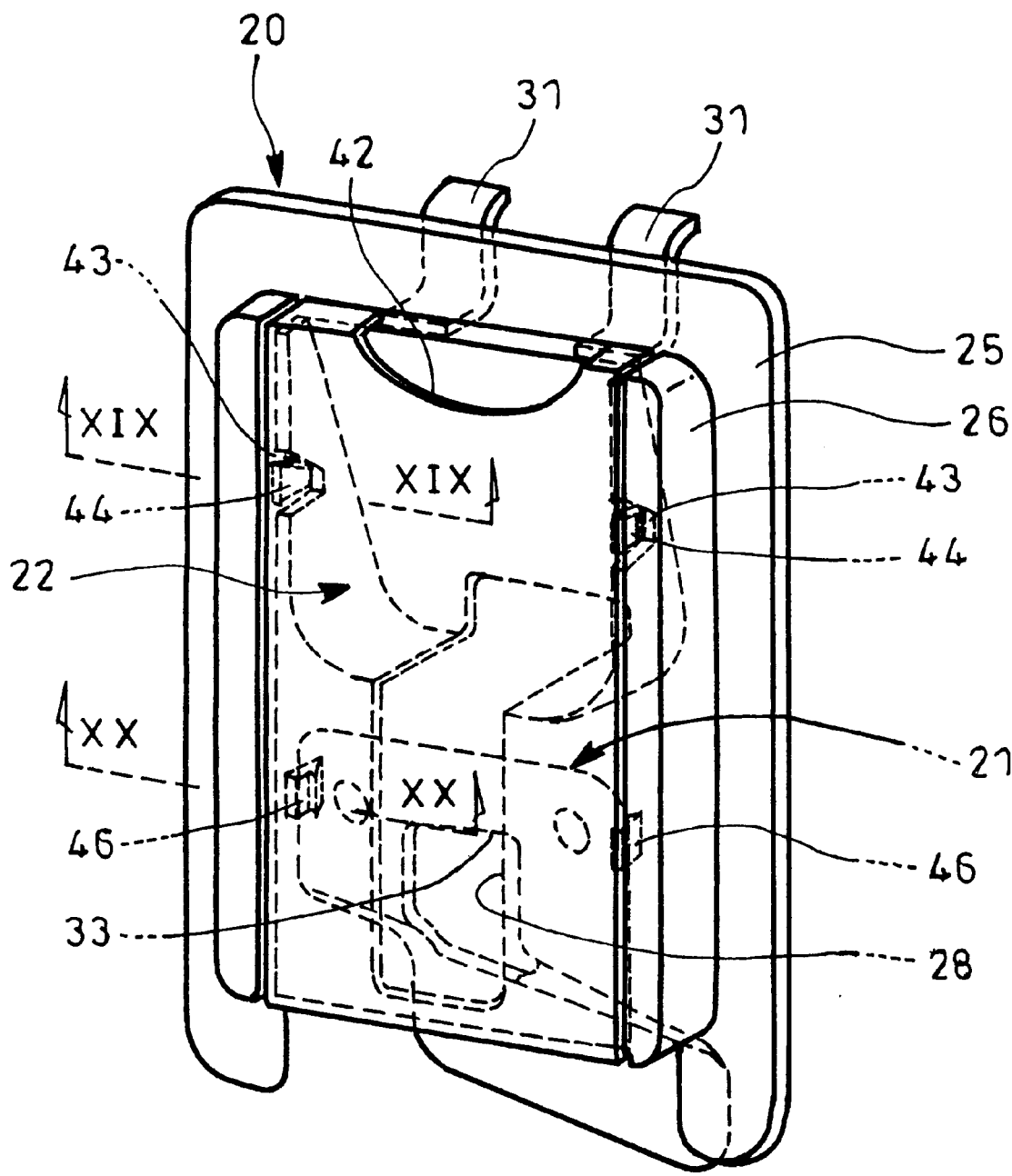
FIG. 18 is a perspective view showing the cover of FIG. 16 with the lid being closed.
Figure 19:
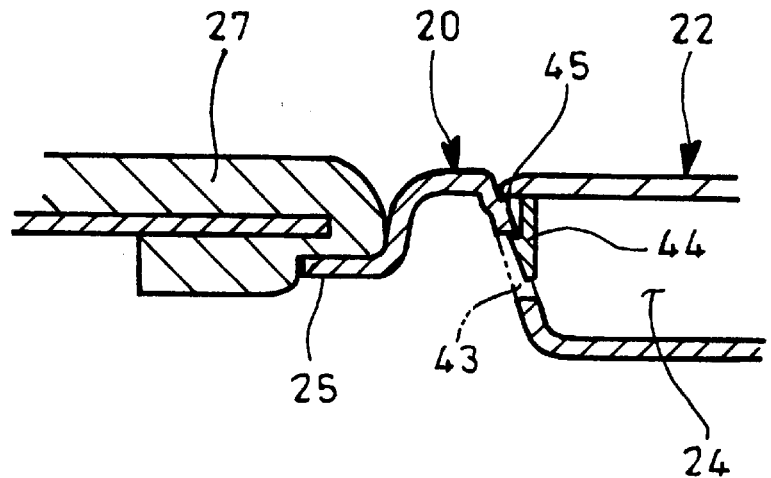
FIG. 19 is a cross-sectional view taken along the line XIX— XIX in FIG. 18.

The rear surface of the lid 22 which is exposed when the lid is opened and pulled down as shown in FIG. 16, is formed with a pair of pieces 44 which are on opposite sides near the curved portion 42 and which are engageable with cutouts 43 on inner sides of the recessed portion 24 when the lid 22 is swung around the hinge 41 to be closed (See FIGS. 18 and 19).

Further, as it is evident especially from FIG. 16, the convex portion 23 to be covered with the lid 22 is partially set back to an extent equal to the thickness of the lid 22 to thereby provide a cover receiving surface 45. As a result, when the lid 22 is closed as shown in FIG. 18 in overlap relationship with the cover receiving surface 45, rigidity in particular of the closed lid 22 in a pushed direction is increased. The closed lid 22 does not protrude from the cover 20 and the both components are coplanar.

Figure 20:
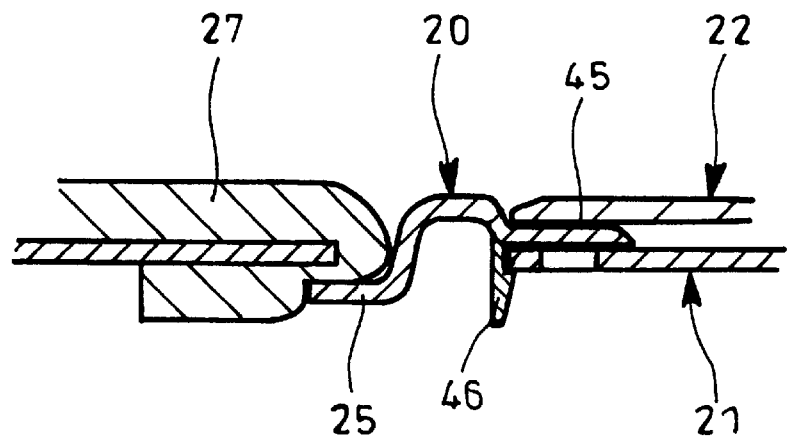
FIG. 20 is a cross-sectional view taken along the line XX—XX in FIG. 18.

In the embodiment shown, also provided is a variation of engagement of the cover 20 with the tether anchor 21. Instead of the pawls 30 on the cover 20 the first embodiment shown in FIGS. 4–15 which are engaged with the openings 34 of the tether anchor 21, pawls 46 as shown in FIGS. 18 and 20 are employed. The pawls 46 are on the rear surface of the cover 20 and are engageable with opposite side edges of the tether anchor 21.

In the second embodiment, it is possible to avoid the trouble that the lid may be lost when the hook 8 is locked on the tether anchor 21. Moreover, in comparison with the case where the cover 20 and the lid 22 are separately arranged, the number of components can be reduced, which will contribute to reduction in number of stages in the assembling.

Particularly in the second embodiment, overlap arrangement of the closed lid 22 on the cover receiving surface 45 will increase the rigidity in particular of the closed lid in a pushed direction. Further, the closed lid is overlapped on and is not protruded from the cover 20 so that the inside cannot be seen from the boundary between the lid 22 and the cover 20, which will improve external appearance at the boundary between the lid 22 and the cover 20.

Figure 21:
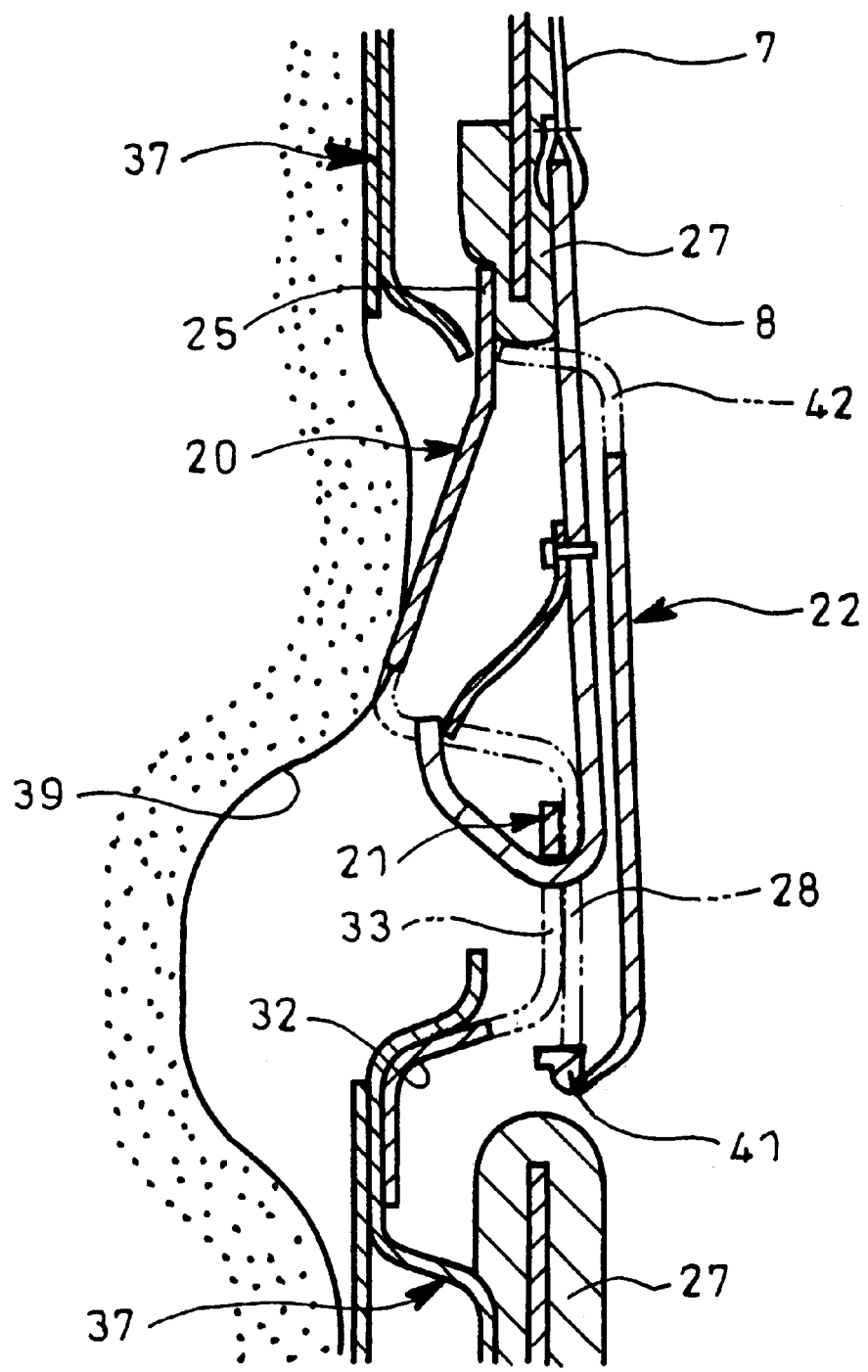
FIG. 21 is a cross-sectional view showing a variation of the lid in the second embodiment.

FIG. 21 shows a variation of the lid 22 in the embodiment shown in FIGS. 16–20. Here, the lid 22 is slightly protruded beyond the seatback board 27 so that any interference between the lid 22 and the hook 8 locked on the tether anchor 21 can be avoided by an extension of the curved portion 42 in a longitudinal direction of the vehicle. As a result, the lid 22 can be closed while the hook 8 is locked on the tether anchor 21.

Figure 22:
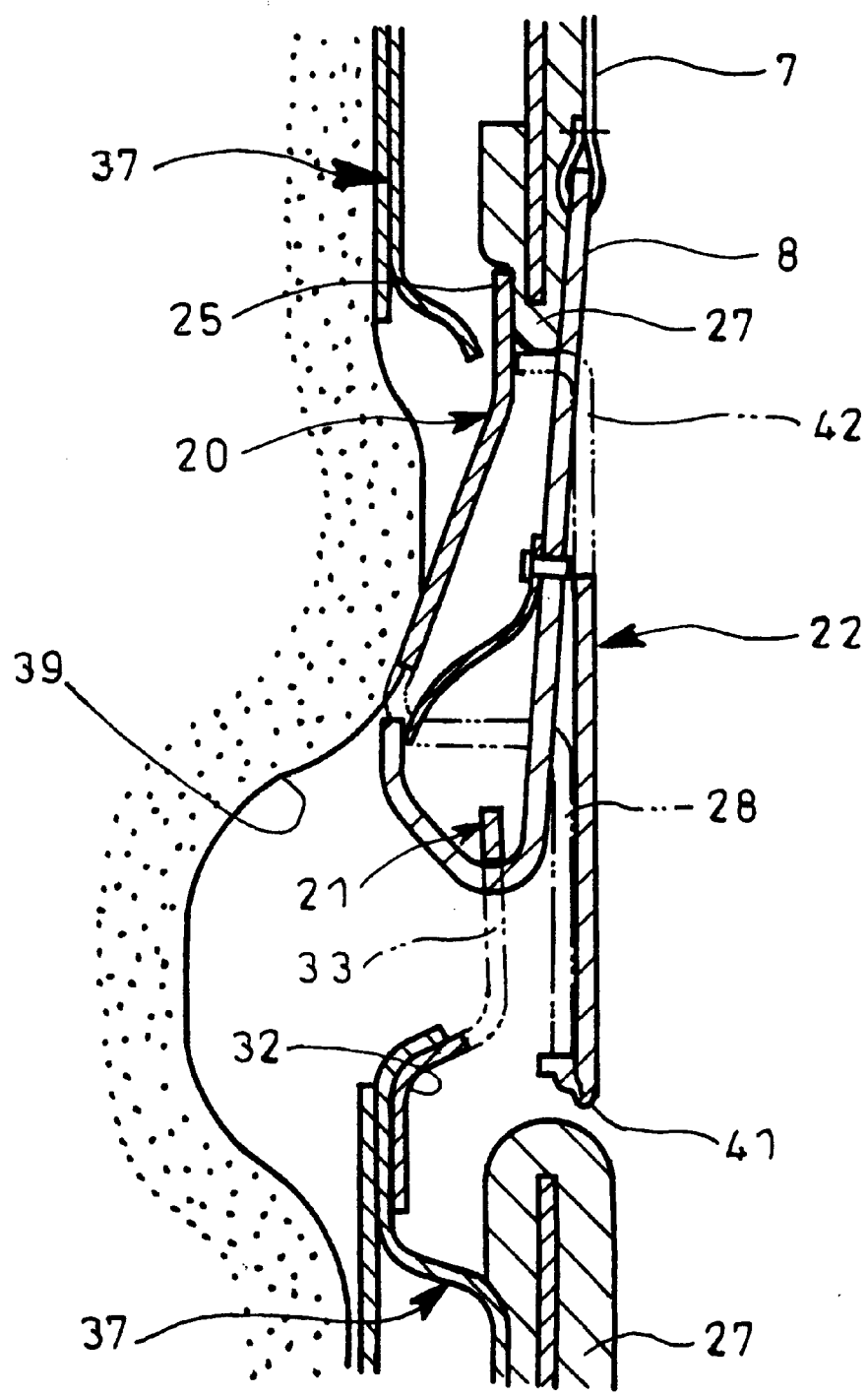
FIG. 22 is a cross-sectional view showing a further variation of the lid in the second embodiment.

FIG. 22 represents a further variation of the lid 22. Here, the tether anchor 21 is set back toward the left in FIG. 22 to set back toward the left in FIG. 22 the position of engagement between the tether anchor 21 and the hook 8 so that any interference between the lid 22 and the hook 8 locked on the tether anchor 21 can be avoided by an extension of the curved portion 42 in a longitudinal direction of the lid 22. As a result, the lid 22 can be closed while the hook 8 is locked on the tether anchor 21.

It is to be understood that the seat for vehicles according to the present invention is not limited to the above embodiments and that various changes and modifications may be made without departing from the spirit and the scope of the present invention.

What is claimed is:

1. A seat for vehicles, said seat comprising:

a tether anchor on a rear surface of a seatback of said seat, wherein said tether anchor engages a hook on an upper end of a child's seat to fix an upper portion of said child's seat to said seat;

a seatback frame to which said tether anchor is fixed; and a cover formed with a notch along a track of the hook on the upper end of the child's seat in a locking operation such that a substantial part of said tether anchor is covered with said cover, except for a portion of said tether anchor on which the hook, on the upper end of the child's seat, is locked.

2. The seat for vehicles according to claim 1, further comprising a shoulder substantially of a size adapted to a thickness of a seatback board and formed on an outer periphery of said cover, except for a top end thereof, to provide a space for accommodating, with no interference, the hook in a locking relationship with said tether anchor which extends downwardly from said top end of said cover.

3. The seat for vehicles according to claim 1, further comprising a lid for blocking said notch on said cover.

4. The seat for vehicles according to claim 2, further comprising a lid for blocking said notch on said cover.

5. The seat for vehicles according to claim 3, wherein said lid is formed integrally with said cover.

6. The seat for vehicles according to claim 4, where said lid is formed integrally with said cover.

* * * * *